US006587584B1

United States Patent
Kang

(10) Patent No.: US 6,587,584 B1
(45) Date of Patent: Jul. 1, 2003

(54) APPARATUS FOR GAMMA CORRECTING IMAGE DATA

(75) Inventor: Hoai-Sig Kang, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 547 days.

(21) Appl. No.: 09/604,558

(22) Filed: Jun. 27, 2000

(30) Foreign Application Priority Data

Jun. 28, 1999 (KR) ............................................. 99-24964

(51) Int. Cl.[7] .................................................. G06K 9/00
(52) U.S. Cl. ........................................ 382/167; 348/674
(58) Field of Search ................................ 382/167, 274, 382/169; 348/674, 254, 222.1; 358/519, 530, 448

(56) References Cited

U.S. PATENT DOCUMENTS

| 4,926,247 A | 5/1990 | Nagasaki et al. |
| 4,926,251 A | 5/1990 | Sekizawa et al. |
| 5,103,299 A | 4/1992 | Asaida |
| 5,325,182 A | 6/1994 | Murata et al. |
| 5,386,304 A | 1/1995 | Suzuki |
| 5,408,267 A * | 4/1995 | Main ........................... 348/254 |
| 5,463,702 A | 10/1995 | Trueblood |
| 5,473,373 A | 12/1995 | Hwung et al. |
| 5,532,765 A | 7/1996 | Inoue et al. |
| 5,764,287 A | 6/1998 | Tatsumi |
| 6,292,165 B1 * | 9/2001 | Lin et al. ...................... 348/674 |
| 6,344,857 B1 * | 2/2002 | Matono et al. .............. 348/674 |

FOREIGN PATENT DOCUMENTS

JP     4-205996     7/1992     ........... G11C/11/41

* cited by examiner

*Primary Examiner*—Phuoc Tran
(74) *Attorney, Agent, or Firm*—Jacobson Holman PLLC

(57) ABSTRACT

In an apparatus for gamma correcting image data including a first image data, a second image data and a third image data, the apparatus includes: a first clock generator for generating a first clock; a second clock generator for generating a second clock, wherein the second clock has a frequency a predetermined times as fast as the first clock; an image data input unit for storing the image data in response to a first clock; a first selecting unit for selectively outputting the image data in response to a second clock; a second selecting unit for selectively outputting a starting point value of corresponding image data in response to the second clock; a third selecting unit for selectively outputting a gamma slope value of corresponding image data in response to the second clock; a piecewise gamma correction unit for receiving output values from the first, the second and the third selecting unit to generate gamma corrected image data; and an output unit for storing the gamma corrected image data a predetermined time and outputting the gamma corrected image data in response to the second clock.

9 Claims, 4 Drawing Sheets

APPARATUS FOR GAMMA CORRECTING IMAGE DATA

FIELD OF THE INVENTION

The present invention relates to an image correcting apparatus; and, more particularly, to an apparatus for gamma correcting image data, which is capable of reducing a chip size.

DESCRIPTION OF THE PRIOR ART

Generally, in a gamma correction of a red (R) image data $D_{RED}$, a green (G) image data $D_{GREEN}$, and a blue (B) image data $D_{BLUE}$, each gamma corrected data is obtained by using exponential functions. However, it is difficult to correctly implement the exponential function by using hardware elements, and, if possible, a lot of hardware elements are required.

FIG. 1 is a block diagram showing a conventional gamma correction apparatus using lookup tables. The lookup tables stores gamma corrected data that are previously calculated. The lookup tables are stored in a storage unit such as ROM (read only memory) and RAM (random access memory).

As shown in FIG. 1, the conventional gamma correction apparatus includes a latch portion 100 for latching image data, a lookup table portion 108 for storing gamma corrected data with respect to the image data, and a gamma latch portion 116 for latching the gamma corrected data outputted from the lookup table portion 108.

The latch portion 100 includes an R latch 102 for latching a red image data $D_{RED}$, a G latch 104 for latching a green color image data $D_{GREEN}$, and a B latch 106 for latching a blue color image data $D_{BLUE}$.

The lookup table portion 108 includes a first lookup table 110 for storing a gamma corrected red image data, a second lookup table 112 for storing a gamma corrected green image data, and a third lookup table 114 for storing a gamma corrected blue image data.

The gamma latch portion 116 includes an R gamma latch 118, a G gamma latch 120, and a B gamma latch 122. The R gamma latch 118 latches the gamma corrected red image data that are outputted from the first lookup table 110. The G gamma latch 120 latches the gamma corrected green image data that are outputted from the second lookup table 112. The B gamma latch 122 latches the gamma corrected blue image data that are outputted from the third lookup table 122.

In such a conventional gamma correction apparatus, R, G, and G linear image data are latched to corresponding latch circuits 102, 104 and 106, respectively. Then, gamma corrected data corresponding to the linear image data is outputted from respective lookup tables. The gamma corrected data read out are latched and outputted to a next image processing circuit. Each gamma corrected data from the gamma latch portion 116 is transferred to a next image processing unit.

In such a conventional gamma correction apparatus, one image data is latched in a corresponding latch and a gamma corrected image data of corresponding image data is outputted to the gamma latch. Then, the gamma corrected image data stored in the gamma latch is outputted to a next image process unit.

However, since the conventional gamma correction apparatus employs individual lookup tables for storing the gamma corrected image data, the hardware elements for implementing the lookup tables are required, thereby increasing a chip size.

SUMMARY OF THE INVENTION

It is, therefore, an object of the present invention to provide an apparatus for gamma correcting image data in an image sensor, capable of reducing a chip size.

In accordance with an aspect of the present invention, there is provided an apparatus for gamma correcting image data including a first image data, a second image data and a third image data, the apparatus comprising: a first clock generating means for generating a first clock; a second clock generating means for generating a second clock, wherein the second clock has a frequency a predetermined times as fast as the first clock; an image data input means for storing the image data in response to a first clock; a first selecting means for selectively outputting the image data in response to a second clock; a second selecting means for selectively outputting a starting point value of corresponding image data in response to the second clock; a third selecting means for selectively outputting a gamma slope value of corresponding image data in response to the second clock; a piecewise gamma correction means for receiving output values from the first, the second and the third selecting means to generate gamma corrected image data; and an output means for storing the gamma corrected image data a predetermined time and outputting the gamma corrected image data in response to the second clock.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
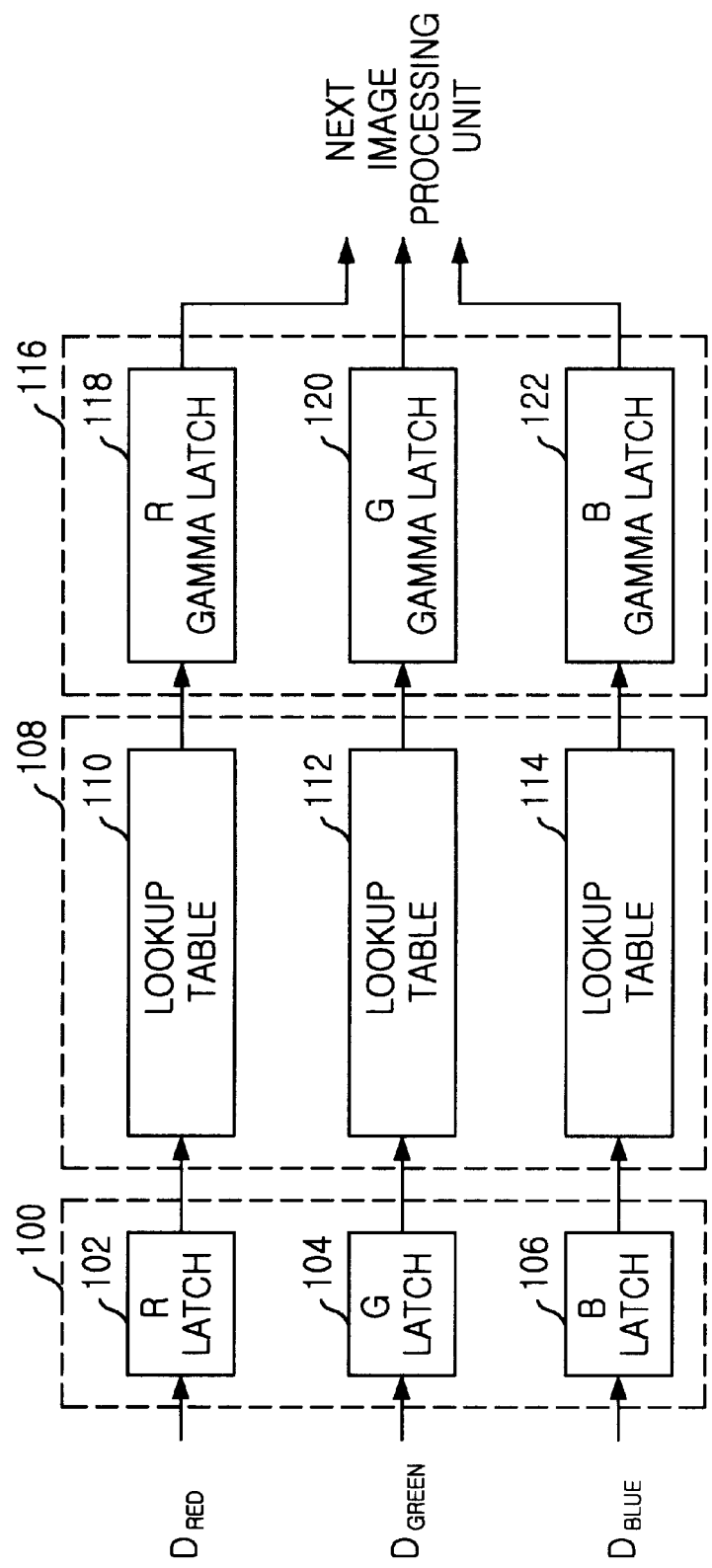
FIG. 1 is a block diagram showing a conventional gamma correction apparatus using lookup tables.
Figure 2:
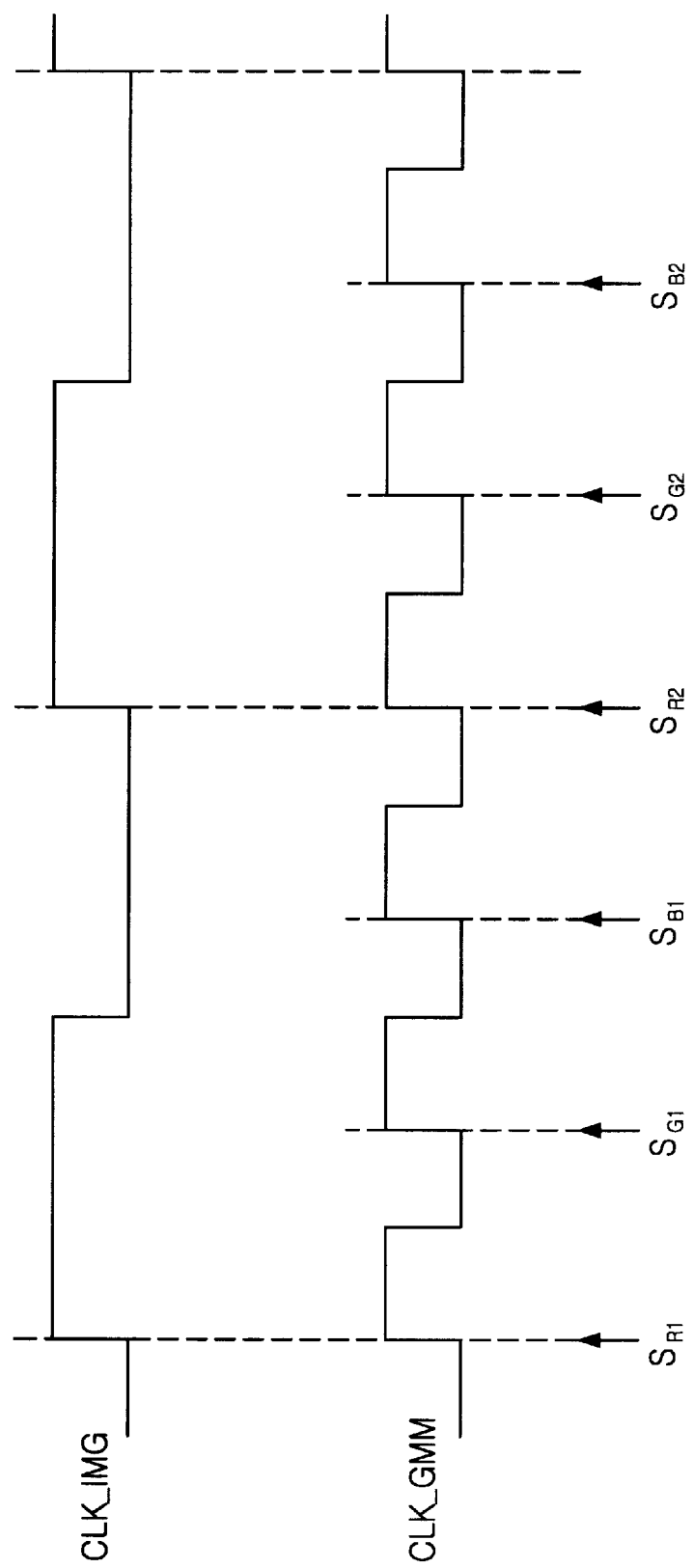
FIG. 2 is a timing chart of a gamma correction clock used for a gamma correction apparatus according to the present invention.

In FIG. 2, there is shown a timing chart of an image process clock and a gamma correction clock used for a gamma correction apparatus according to the present invention.

Referring to FIG. 2, a gamma correction clock CLK_GMM has a frequency three times as fast as an image process clock CLK_IMG. The image process clock CLK_IMG is a signal used to process image data and the gamma correction clock CLK_GMM is a signal used to gamma correct the image data. That is, during one period of the image process clock CLK_IMG, red, green, and blue image data are gamma corrected in synchronization with rising edges of the gamma correction clock GLK_GMM.

At a first rising edge $S_{R1}$ of the gamma correction clock CLK_GMM, the red image data is gamma corrected. Then, at a second rising edge $S_{G1}$ of the gamma correction clock CLK_GMM, the green image data is gamma corrected. Then, at a third rising edge $S_{B1}$ of the gamma correction clock CLK_GMM, the blue image data is gamma corrected. Then, in the same manner, next image data is gamma corrected.

At this time, at the second rising edge $S_{G1}$ of the gamma correction clock CLK_GMM, a gamma correction of the red image data is ended and a gamma correction of the green image data is started. In the same manner, at the third rising edge $S_{B1}$ of the gamma correction clock CLK_GMM, a gamma correction of the green image data is ended and a gamma correction of the blue image data is started.

Figure 3:
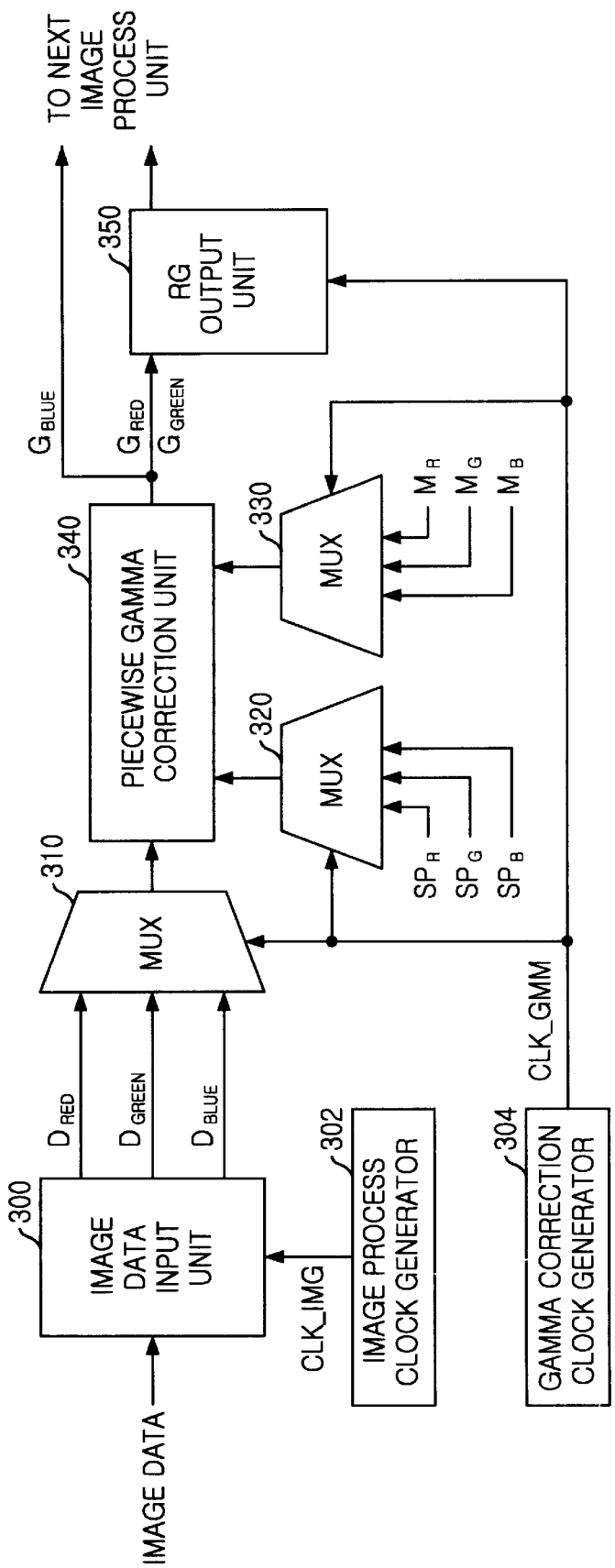
FIG. 3 is a schematic diagram illustrating a gamma correction apparatus in accordance with the present invention.

FIG. 3 is a schematic diagram illustrating a gamma correction apparatus in accordance with an embodiment of the present invention.

Referring to FIG. 3, an image data input unit 300 receives a red mage data $D_{RED}$, a green image data $D_{GREEN}$, and a blue image data $D_{BLUE}$ in response to a rising edge of the image process clock CLK_IMG from an image process clock generator 302. Then, the image data input unit 300 stores the image data $D_{RED}$, $D_{GREEN}$ $D_{BLUE}$ until a next rising edge of the image process clock CLK_IMG from a gamma correction clock generator 304.

A first multiplexer 310 selectively outputs the image data $D_{RED}$, $D_{GREEN}$ and $D_{BLUE}$ in response to the gamma correction clock CLK_GMM.

That is, the first multiplexer 310 outputs the red image data $D_{RED}$ in response to a first rising edge $S_{R1}$ of the gamma correction lock CLK_GMM. Then, the first multiplexer 310 outputs the green image data $D_{GREEN}$ in response to a second rising edge $S_{G1}$ of the gamma correction clock CLK_GMM. Then, the first multiplexer 310 outputs the blue image data $D_{BLUE}$ in response to a third rising edge SB of the gamma correction clock CLK_GMM.

A second multiplexer 320 selectively outputs each starting point value of the image data $D_{RED}$, $D_{GREEN}$ and $D_{BLUE}$ in response to the gamma correction clock CLK_GMM.

A third multiplexer 330 selectively outputs each gamma slope value of the image data $D_{RED}$, $D_{GREEN}$ and $D_{BLUE}$ in response to the gamma correction clock CLK_GMM.

A piecewise gamma correction unit 340 receives the image data from the first multiplexer 310, the starting point value SP from the second multiplexer 320, and the gamma slope value M from the third multiplexer 330. And then the piecewise gamma correction unit 340 performs a gamma correction by using a piecewise linear approximation method, to output gamma corrected image data $G_{RED}$, $G_{GREEN}$ and $G_{BLUE}$.

Figure 4:
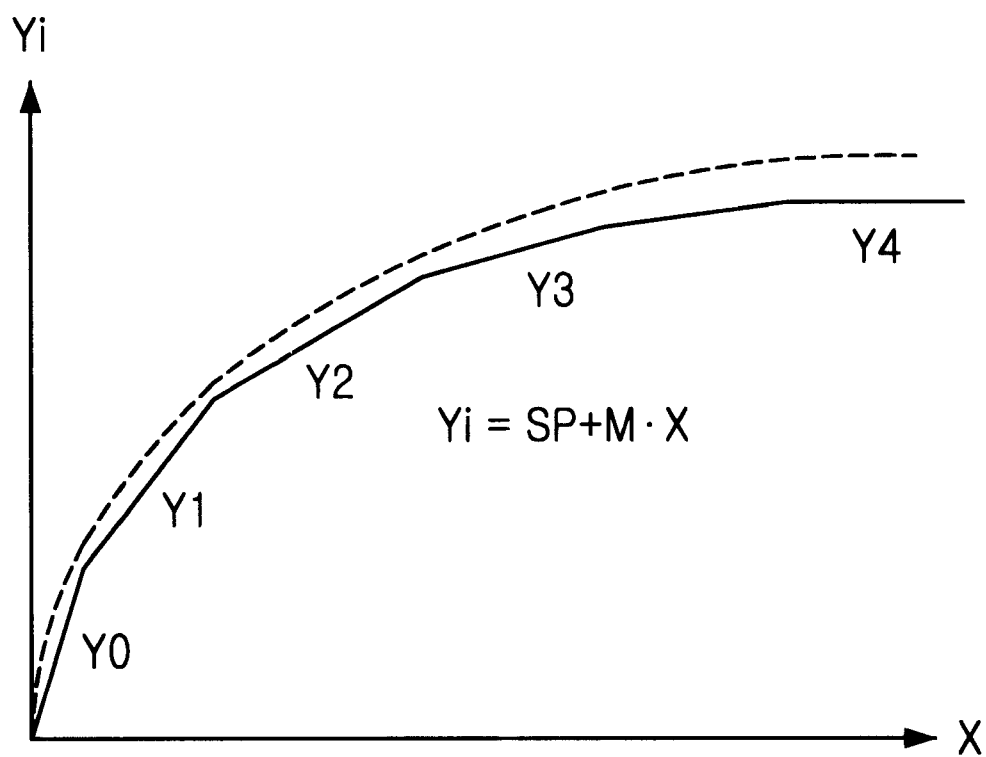
FIG. 4 is a graph illustrating a scheme of a piecewise gamma correction.

FIG. 4, a relation between the gamma corrected image data and an image data is illustrated. A reference symbol Yi represents a gamma corrected image data, SP a starting point value, M a gamma slope value, and X a corresponding image data. For the sake of simplicity in description, a detailed operation of the piecewise gamma correction unit will be omitted since it is well known to those skilled in the art.

An RG output unit 350 receives and stores a gamma corrected red image data $G_{RED}$ and a gamma corrected green image data $G_{GREEN}$ from the piecewise gamma correction unit 330. When a gamma correction of the blue image data is completed, the RG output unit 350 simultaneously outputs the gamma corrected red image data $G_{RED}$ and the gamma corrected green image data $G_{GREEN}$ to a next image process unit in response to the gamma correction clock CLK_GMM. On the contrary, a gamma corrected blue image data $G_{BLUE}$ from the piecewise gamma correction unit 330 is directly outputted to the next process unit.

An operation of the gamma correction apparatus in accordance with the present invention will be described in detail with reference to FIGS. 2 and 3.

First, the image data $D_{RED}$, $D_{GREEN}$ and $D_{BLUE}$ are inputted and stored to the image data input unit 300 in response to the image process clock CLK_IMG, and then, the image data is outputted to the first multiplexer 310.

The red image data $D_{RED}$ is then outputted to the piecewise gamma correction unit 330 in response to a first rising edge $S_{R1}$ of the gamma correction clock CLK_GMM. The second multiplexer 320 and the third multiplexer 330 also output a starting point value $SP_R$ and a gamma slope value $M_R$ of the red image data to the gamma correction unit 340 in response to the first rising edge $S_{R1}$ of the gamma correction clock CLK_GMM, respectively. Then, during one period of the gamma correction clock CLK_GMM, the piecewise gamma correction unit 340 receives the red image data $D_{RED}$, the gamma slope value $M_R$ and the starting point value $SP_R$ and performs a gamma correction by using a piecewise linear approximation method to generate a gamma corrected red image data $G_{RED}$.

The gamma corrected red image data $G_{RED}$ is stored to the RG output unit 350 in response to a second rising edge $S_{G1}$ of the gamma correction clock CLK_GMM. The gamma corrected red image data $G_{RED}$ is stored until a next image process clock CLK_IMG.

Next, the green image data $D_{GREEN}$ is outputted through the first multiplexer 310 to the piecewise gamma correction unit 340 in response to a second rising edge $S_G$ of the gamma correction clock CLK_GMM. Additionally, the second multiplexer 320 and the third multiplexer 330 also output a starting point value $SP_G$ and a gamma slope value $M_G$ of the green image data to the piecewise gamma correction unit 340 in response to the second rising edge $S_G$ of the gamma correction clock CLK_GMM. Then, during one period of the gamma correction clock CLK_GMM, the piecewise gamma correction unit 340 receives the green image data $D_{GREEN}$, the gamma slope value $M_G$ and the starting point value $SP_G$, and performs a gamma correction to generate a gamma corrected green image data $G_{GREEN}$.

The gamma corrected green image data $G_{GREEN}$ is stored to the RG output unit 350 in response to a third rising edge $S_{G1}$ of the gamma correction clock CLK_GMM. The gamma corrected green image data $G_{GREEN}$ is stored until the next image process clock.

Next, the blue image data $D_{BLUE}$ is outputted through the first multiplexer 310 to the piecewise gamma correction unit 330 in response to a third rising edge $S_{B1}$ of the gamma correction clock CLK_GMM. Additionally, the second multiplexer 320 and the third multiplexer 330 output a starting point value $SP_B$ and a gamma slope value $M_B$ of the blue image data to the piecewise gamma correction unit 340 in response to the third rising edge $S_{B1}$ of the gamma correction clock CLK_GMM. Then, during one period of the gamma correction clock CLK_GMM, the piecewise gamma correction unit 330 receives the blue image data $D_{BLUE}$, the gamma slope value $M_G$ and the starting point value $SP_G$, and performs a gamma correction to generate a gamma corrected blue image data $G_{BLUE}$.

The gamma corrected blue image data $G_{BLUE}$ is simultaneously outputted to the next image process unit together with the gamma corrected red image data $G_{RED}$ and the gamma corrected green image data $G_{GREEN}$.

As described above, by using the gamma correction clock CLK_GMM having a frequency three times as fast as the image process clock CLK_IMG, a gamma correction of the image data are achieved in response to the rising edges of the gamma correction clock CLK_GMM during one period of the image process clock CLK_IMG. Therefore, hardware element for performing the gamma correction operation is commonly shared, so that a chip size of the gamma correction apparatus according to the present invention is remarkably reduced compared with the conventional gamma correction apparatus.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for gamma correcting image data, the image data including a first image data, a second image data and a third image data, the apparatus comprising:

a first clock generating means for generating a first clock;

a second clock generating means for generating a second clock, wherein the second clock has a frequency a predetermined times as fast as the first clock;

an image data input means for storing the image data in response to a first clock;

a first selecting means for selectively outputting the image data in response to a second clock;

a second selecting means for selectively outputting a starting point value of corresponding image data in response to the second clock;

a third selecting means for selectively outputting a gamma slope value of corresponding image data in response to the second clock;

a piecewise gamma correction means for receiving output values from the first, the second and the third selecting means to generate gamma corrected image data; and an output means for storing the gamma corrected image data a predetermined time and outputting the gamma corrected image data in response to the second clock.

2. The apparatus as recited in claim 1, wherein the second clock has a frequency three times as fast as the first clock.

3. The apparatus as recited in claim 2, wherein the first selecting means outputs the first image data in response to a first rising edge of the second clock, wherein the first selecting means outputs the second image data in response to the second rising edge of the second clock; and wherein the first multiplexing means outputs the third image data in response to the third rising edge of the second clock.

4. The apparatus as recited in claim 3, wherein the second selecting means outputs a starting point value of the first image data in response to the first rising edge of the second clock;

wherein the second selecting means outputs a starting point value of the second image data in response to the second rising edge of the second clock; and wherein the second selecting means outputs a starting point value of the third image data in response to the third rising edge of the second clock.

5. The apparatus as recited in claim 4, wherein the third electing means outputs a gamma slope value of the third image data in response to the first rising edge of the second clock;

wherein the third selecting means outputs a gamma slope value of the second image data in response to the second rising edge of the second clock; and wherein the third selecting means outputs a gamma slope value of the third image data in response to the third rising of the second clock.

6. The apparatus as recited in claim 5, wherein the output means stores a gamma corrected first image data and a gamma corrected second image data.

7. The apparatus as recited in claim 6, wherein the gamma corrected first image data and the gamma corrected second image data stored in the output means are simultaneously outputted to a next image process means when a gamma corrected third image data is outputted from the piecewise gamma correction means.

8. The apparatus as recited in claim 1, wherein the first, the second and the third selecting means are multiplexers.

9. The apparatus as recited in claim 1, wherein the first image data is a red image data, wherein the second image data is a green image data, and wherein the third image data is a blue image data.

* * * * *